May 22, 1956   J. B. POWERS   2,746,883
PROCESS FOR FLAME SPRAYING PLASTISOL
Filed March 27, 1952
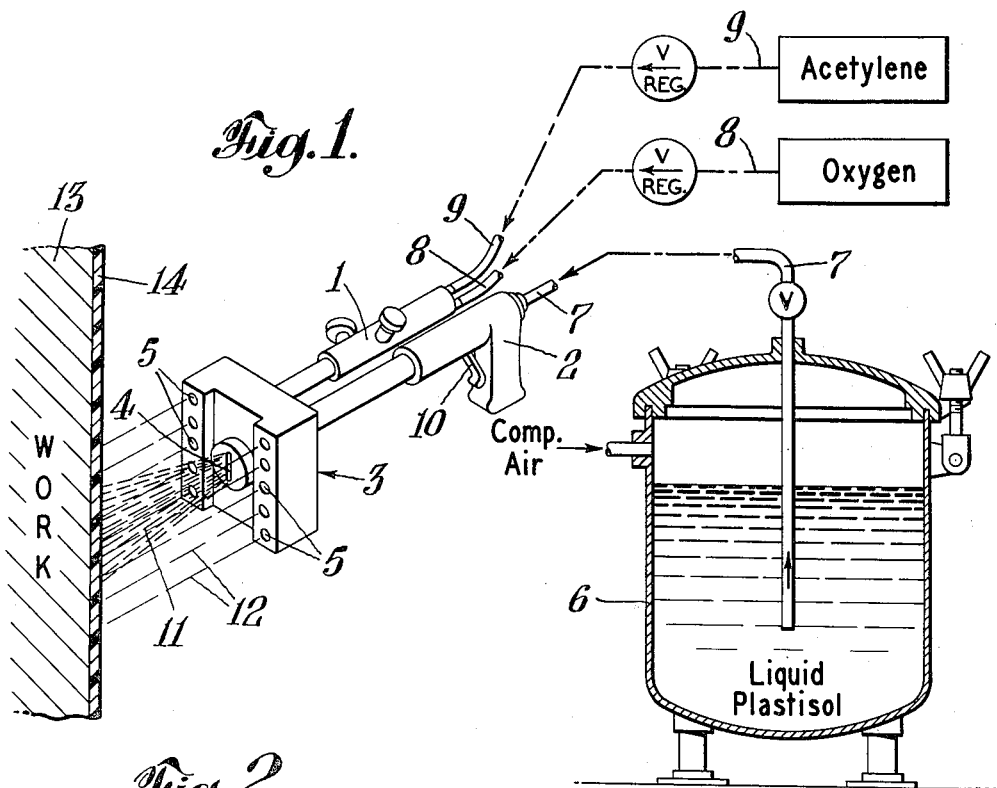
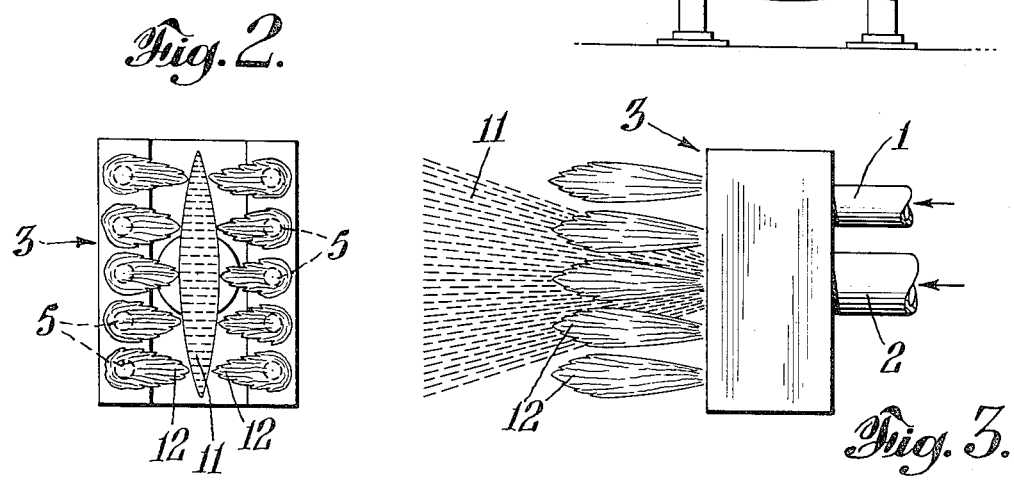
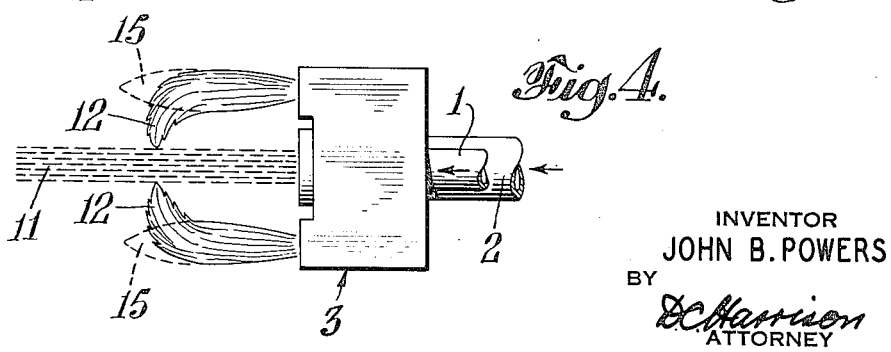
INVENTOR
JOHN B. POWERS
BY
DCHarrison
ATTORNEY

United States Patent Office 2,746,883
Patented May 22, 1956

---

2,746,883
PROCESS FOR FLAME SPRAYING PLASTISOL

John Bernard Powers, Metuchen, N. J., assignor to Union Carbide and Carbon Corporation, a corporation of New York Application March 27, 1952, Serial No. 278,909

10 Claims. (Cl. 117—103)

This invention relates to the flame spraying of plastisol and, more particularly, to a novel process for applying a coating of plasticized vinyl resin in continuous films to surfaces of non-uniform sizes and shapes.

Heretofore, vinyl resin films have been applied to surfaces by dipping the surface to be coated in a dispersion of plastisol and then baking in an oven to fuse the resin particles in a continuous film. The shortcomings of this dipping process are at once evident, the most serious limitation being that on the size of the surface to be coated.

It is, therefore, an object of the present invention to provide a process whereby continuous films of plasticized vinyl resin may be applied to surfaces.

It is also an object of the present invention to provide a process whereby continuous films of plasticized vinyl resin may be applied without delamination.

A still further object is to provide a process for patching vinyl resin films.

Other aims and advantages of the present invention will be apparent from the following description and appended claims.

In the drawing:

Fig. 1 is a view of a plastisol flame spraying apparatus suitable for carrying out the process of the present invention, wherein the liquid dispenser tank and workpiece are shown in sectional view and the flame-spray gun is shown in perspective view;

Fig. 2 is a front view of the spraying head of a plastisol flame-spray gun suitable for carrying out the process of the present invention showing inward curvature of the flames during the plastisol spraying operation;

Fig. 3 is a side view of the spraying head during the plastisol spraying operation; and Fig. 4 is a plan view of the spraying head during the plastisol spraying operation.

The term "plastisol," as employed herein, refers to a dispersion of finely-divided polymeric resin (containing vinyl chloride combined in the polymer) in non-aqueous liquids which do not have appreciable solvent action at ordinary temperatures. Upon heating to a sufficiently high temperature, plastisol liquids will jell to form a solid plasticized resin. These non-aqueous liquids consist of plasticizers and contain no appreciable amount of volatile components, if any.

The process of the present invention requires the use of a plastisol having a suitable spraying viscosity and an ignition point sufficiently high that no appreciable burning occurs during the spraying or fusing operation. In addition, the plastisol contains a suitable heat stabilizer of any known type so that no appreciable resin decomposition can occur during the spraying or fusing operation.

In accordance with the process of the present invention a finely atomized spray of plastisol is passed through a flame zone where it comes into momentary contact with the high temperature outer gas envelope of, for example, an oxy-acetylene flame. The plastisol spray consists of resin particles approximately 0.05–1.3 microns in diameter associated with a quantity of liquid plasticizer.

Contact with the flame envelope causes a further partial solvation of the resin in the plasticizer which is accompanied by a partial jellation of the dispersion. This partially jelled plastisol is then deposited on the surface to be coated in a uniform film in the order of 2–10 mils in thickness. With the proper heat output to plastisol ratio the coat will have jelled sufficiently so that it will not run, although it has not solidified. This uniform film is heated to a temperature of approximately 150–400° F. to fuse the resin-plasticizer dispersion into a continuous film of plasticized vinyl resin. It has been found that film thicknesses of 8–10 mils are preferable since, when greater or lesser thicknesses are applied, difficulty is encountered in fusing the coat.

Upon applying and fusing one layer, the above process is repeated until a continuous coating of any desired thickness is built up. As successive layers of film are built up the problem of delamination becomes important. The interface temperature between successive layers of coating has to be sufficiently high in order to insure that the next layer will adhere. This temperature may be maintained either by the heat input from the fusing of the previous layer or by the heat input from the next layer of flame-sprayed plastisol. Where large and massive workpieces are being coated or where work is being done out of doors it is very difficult to maintain this high interface temperature by means of the heat used to fuse the previous layer. In that case it is essential, in order to prevent delamination, that the plastisol spray pass through the flame zone before deposition. It has also been found advisable in such cases to build up the first layer to a greater than normal thickness thereby partially heat-insulating successive layers from the cold metal mass.

It is also desirable to have a high rate of heat input during the fusing or curing operation in which the plastisol is jelled so that the interface builds up in temperature and results in a better bonding of the next successive layer. Care must, however, be taken to prevent such a buildup of temperature that the already fused layer insolubilizes thereby causing delamination.

It has been found that the heat input required for the fusing operation may be accomplished in a variety of ways among which are flame treatment, hot air blast treatment, and conventional oven heating.

In the flame treatment heat input method an oxy-acetylene flame, or other suitable flame, is passed over the sprayed surface causing fusing of the film of partially jelled plastisol. In performing this operation the heat input is accomplished at a relatively high temperature and care must be taken to prevent scorching of the film.

It has been found that the possibility of scorching the film is eliminated when the hot air blast method of fusing is used. In this method an air blast is preferably passed through a flame and then directed against the sprayed surfaces. By fusing with such a hot air blast, the required heat input may be obtained at a temperature lower than that at which film scorching occurs.

Another decided advantage of the hot air blast method over the flame method of fusing, when the operation is conducted out of doors, is that the former is less subject to influence by ambient wind. The effect of ambient wind on the fusing flames of the latter method is, however, minimized by operating with a high velocity, and consequently more stable, flame.

One form of apparatus for carrying out the process of the present invention, as shown in the drawing, comprises a conventional oxy-acetylene blowpipe 1 and a fluid spray gun 2 both feeding into a flame spray head 3. A slotted liquid spray orifice 4 is located in the center of the face of the flame spray head and is surrounded by two parallel rows of flame ports 5. The atomized spray discharged from the flame spray head is fan-shaped and parallel to the rows of flame ports.

Liquid plastisol is fed into dispenser tank 6 into which compressed air is fed forcing the liquid plastisol through line 7 to the spray gun 2. Oxygen and acetylene, or any other suitable combustible gas, are fed to the blowpipe 1 through lines 8 and 9, respectively.

During the spraying operation spray gun lever 10 is depressed and a finely atomized spray of liquid plastisol 11 is emitted from the gun through slotted orifice 4. This spray of liquid plastisol carried in air produces a low pressure area around the spray which results in the convergence of flames emanating from flame ports 5 toward the spray 11. These flames, which are produced during the spraying operation, will be referred to as spraying flames. As is clearly shown in Figs. 2, 3, and 4 of the drawing, the finely atomized spray pattern comes into contact with outer envelope of the hot combustion gases. The application of heat to the plastisol spray in this manner produces a further partial solvation of the resin in the plastisol dispersion in flight prior to deposition as a partially jelled dispersion on the work surface 13.

The flame fusing or curing operation is performed after a proper coating 14 has been sprayed on work surface 13. Since the plastisol spray is not operated during the fusing operation the fusing flame 15 is a normal flame and has no convergence. During the fusing operation, under the influence of the heat input from the flame, the plastisol is brought to a temperature of approximately 150–400° F. whereupon the coating is fused forming a jelled solid. As mentioned hereinabove, hot air blast and oven methods may alternatively be used for flame fusing.

It is, of course, understood that it is not intended to limit the present process to flame fusing. The fusing operation may alternatively be accomplished by hot air blast or oven fusing of the flame-sprayed partially jelled plastisol coating.

Protective vinyl resin coatings may be applied, in accordance with the process of the present invention, to any surface having an ignition point sufficiently high that burning of the surface does not occur during the spraying operation. In applying such protective coatings to non-porous surfaces it is first desirable to precoat the surface with a suitable primer to enable the coating to adhere to the surface.

It has been found that protective coatings of plasticized vinyl resin, applied in accordance with the present invention, can successfully withstand high temperatures without sagging. Such coatings have a high corrosion resistance as well as a high resistance to the action of inorganic chemicals generally.

It is to be understood that the process of the present invention is not limited to use with any particular plastisol formulation but may be employed with any plastisol having the requisite characteristics disclosed hereinabove.

What is claimed is:

1. A process for applying a plastisol dispersion to a surface of a workpiece comprising, forming at a temperature below which appreciable solvation of the resin in the plasticizer occurs a finely atomized spray of plastisol, passing said spray in contact with the hot combustion products of a combustible gas flame thereby causing partial solvation of the resin in said plastisol to produce a partially jelled plastisol dispersion, and depositing said partially jelled plastisol dispersion as a thin film on said surface.

2. A process for applying a protective coating of plasticized vinyl resin to a surface of a workpiece comprising, forming at a temperature below which appreciable solvation of the resin in the plasticizer occurs a finely atomized spray of plastisol, passing said spray in contact with the hot combustion products of a combustible gas flame thereby causing partial solvation of the resin in said plastisol to produce a partially jelled plastisol dispersion, depositing said partially jelled plastisol dispersion as a thin film on said work surface, and applying heat to said partially jelled plastisol dispersion until the temperature is raised sufficiently to fuse substantially all of the resin particles in said dispersion.

3. A process for applying a protective coating of plasticized vinyl resin to a surface of a workpiece comprising, forming at a temperature below which appreciable solvation of the resin in the plasticizer occurs a finely atomized spray of plastisol, passing said spray in contact with the outer envelope of a combustible gas flame thereby causing partial solvation of the resin in said plastisol to produce a partially jelled plastisol dispersion, depositing said partially jelled plastisol dispersion as a film on said work surface, and heating said film with a combustible gas flame to a temperature sufficient to fuse substantially all of said resin particles in said dispersion.

4. A process for applying a protective coating of plasticized vinyl resin to a surface of a workpiece comprising, forming at a temperature below which appreciable solvation of the resin in the plasticizer occurs a finely atomized spray of plastisol, passing said spray in contact with the outer hot combustion products of a combustible gas flame thereby causing partial solvation of the resin in said plastisol to produce a partially jelled plastisol dispersion, depositing said partially jelled plastisol dispersion as a film on said work surface, and directing a hot air stream against said film to fuse substantially all of said resin particles in said deposited dispersion.

5. A process for applying a protective coating of plasticized vinyl resin to a surface of a workpiece comprising, forming at a temperature below which appreciable solvation of the resin in the plasticizer occurs a finely atomized spray of plastisol, passing said spray in contact with the outer hot combustion products of a combustible gas flame thereby causing partial solvation of the resin in said plastisol to produce a partially jelled plastisol dispersion, depositing said partially jelled plastisol dispersion as a film on said work surface, mixing a stream of air under pressure with a combustible gas flame to heat said air stream, and directing said hot air stream against said film to fuse substantially all of said resin particles in said deposited dispersion.

6. A process for applying a protective coating of plasticized vinyl resin to a surface of a workpiece comprising, forming at a temperature below which appreciable solvation of the resin in the plasticizer occurs a finely atomized spray of plastisol, passing said spray in contact with the outer hot combustion products of a combustible gas flame thereby causing partial solvation of the resin in said plastisol to produce a partially jelled plastisol dispersion, depositing said partially jelled plastisol dispersion as a film on said work surface, placing said workpiece in an oven, and applying heat to said partially jelled plastisol dispersion at a temperature sufficient to fuse substantially all of said resin particles in said dispersion.

7. A process for applying a substantially integrally-bonded multiple film protective coating of plasticized vinyl resin to a surface of a workpiece comprising: forming at a temperature below which appreciable solvation of the resin in the plasticizer occurs a finely atomized spray of plastisol particles; passing said spray in contact with the outer hot combustion products of a combustible gas flame, thereby causing partial solvation of the resin in said plastisol to produce a partially jelled plastisol dispersion; as a depositing step, applying an initial film of said partially jelled plastisol dispersion to said surface; as a fusing step, applying heat to said initial film to a temperature sufficient to cause fusion of substantially all of said resin particles; and thereafter repeating alternately said depositing step and then said fusing step until a coating of a suitable number of plasticized vinyl resin films is applied to said surface.

8. A process for applying a substantially integrally-bonded multiple film protective coating of plasticized vinyl resin to a surface of a workpiece comprising: forming at a temperature below which appreciable solvation of the resin in the plasticizer occurs a finely atomized spray of plastisol particles; passing said spray in contact with the outer hot combustion products of a combustible gas flame, thereby causing partial solvation of the resin in said plastisol to produce a partially jelled plastisol dispersion; as a depositing step, applying an initial film of said partially jelled plastisol dispersion to said surface; as a fusing step, applying heat by means of a combustible gas flame to said initial film to a temperature sufficient to cause fusion of substantially all of said resin particles; and thereafter repeating alternately said depositing step and then said fusing step until a coating of a suitable number of plasticized vinyl resin films is applied to said surface.

9. A process for applying a substantially integrally-bonded multiple film protective coating of plasticized vinyl resin to a surface of a workpiece comprising: forming at a temperature below which appreciable solvation of the resin in the plasticizer occurs a finely atomized spray of plastisol particles; passing said spray in contact with the outer hot combustion products of a combustible gas flame, thereby causing partial solvation of the resin in said plastisol to produce a partially jelled plastisol dispersion; as a depositing step, applying an initial film of said partially jelled plastisol dispersion to said surface; as a fusing step, applying oven heat to said initial film to a temperature sufficient to cause fusion of substantially all of said resin particles; and thereafter repeating alternately said depositing step and then said fusing step until a coating of a suitable number of plasticized vinyl resin films is applied to said surface.

10. A process for applying a substantially integrally-bonded multiple film protective coating of plasticized vinyl resin to a surface of a workpiece comprising: forming at a temperature below which appreciable solvation of the resin in the plasticizer occurs a finely atomized spray of plastisol particles; passing said spray in contact with the outer hot combustion products of a combustible gas flame, thereby causing partial solvation of the resin in said plastisol to produce a partially jelled plastisol dispersion; as a depositing step, applying an initial film of said partially jelled plastisol dispersion to said surface; as a fusing step, applying heat by means of a hot air blast to said initial film to a temperature sufficient to cause fusion of substantially all of said resin particles; and thereafter repeating alternately said depositing step and then said fusing step until a coating of a suitable number of plasticized vinyl resin films is applied to said surface.

References Cited in the file of this patent

UNITED STATES PATENTS

| | | |
|---|---|---|
| 2,188,396 | Semon | Jan. 30, 1940 |
| 2,245,708 | Patton | June 17, 1941 |
| 2,355,225 | MacWilliam | Aug. 8, 1944 |
| 2,410,225 | Macht | Oct. 29, 1946 |
| 2,510,143 | Sandora et al. | June 6, 1950 |
| 2,511,797 | Hochberg | June 13, 1950 |
| 2,521,179 | Mitchell | Sept. 5, 1950 |
| 2,610,131 | Shanklin et al. | Sept. 9, 1952 |

OTHER REFERENCES

Sirota: Organic Finishing, vol. 11, No. 12, December 1950, pages 11–15.